(12) United States Patent
Ross

(10) Patent No.: US 8,336,037 B1
(45) Date of Patent: Dec. 18, 2012

(54) JNI-MINIMIZING DATA STRUCTURES FOR XML PARSING

(76) Inventor: Richard A. Ross, Berkeley, CA (US)

( * ) Notice: Subject to any disclaimer, the term of this patent is extended or adjusted under 35 U.S.C. 154(b) by 1616 days.

(21) Appl. No.: 11/749,675

(22) Filed: May 16, 2007

Related U.S. Application Data

(60) Provisional application No. 60/801,324, filed on May 17, 2006.

(51) Int. Cl.
*G06F 9/45* (2006.01)
*G06F 9/44* (2006.01)

(52) U.S. Cl. ......... 717/143; 717/116; 717/136; 717/142

(58) Field of Classification Search .................. None
See application file for complete search history.

(56) References Cited

U.S. PATENT DOCUMENTS

| | | | | |
|---|---|---|---|---|
| 6,507,856 | B1* | 1/2003 | Chen et al. | 715/205 |
| 6,658,647 | B1* | 12/2003 | MacLeod et al. | 717/118 |
| 7,155,706 | B2* | 12/2006 | Snover et al. | 717/143 |
| 7,574,692 | B2* | 8/2009 | Herscu | 717/116 |
| 7,861,236 | B2* | 12/2010 | Grebenev | 717/142 |
| 2004/0075683 | A1* | 4/2004 | Savage | 345/741 |
| 2005/0060693 | A1* | 3/2005 | Robison et al. | 717/143 |
| 2006/0004827 | A1* | 1/2006 | Stuart | 707/102 |
| 2007/0113222 | A1* | 5/2007 | Dignum et al. | 717/143 |
| 2008/0010629 | A1* | 1/2008 | Berg et al. | 717/116 |
| 2008/0022264 | A1* | 1/2008 | Macklem et al. | 717/136 |
| 2008/0022267 | A1* | 1/2008 | Johnson et al. | 717/143 |
| 2008/0046874 | A1* | 2/2008 | Kostoulas et al. | 717/143 |

OTHER PUBLICATIONS

Fiebig et al., Anatomy of a native XML base management system, Dec. 2002, 23 pages, <http://delivery.acm.org/10.1145/770000/764202/20110292.pdf>.*
Weigel et al., Exploiting native XML indexing techniques for XML retrieval in relational database systems, Nov. 2005, 8 pages, <http://delivery.acm.org/10.1145/1100000/1097054/p23-weigel.pdf>.*
Wijkman et al., Transparent Java standard extensions with native libraries on multiple platforms, Jun. 2003, 3 pages, <http://delivery.acm.org/10.1145/960000/957303/p41-wijkman.pdf>.*

* cited by examiner

*Primary Examiner* — Thuy Dao
(74) *Attorney, Agent, or Firm* — North Shore Patents, P.C.; Michele Liu Baillie

(57) ABSTRACT

Client Native method Interface (CNI) minimizing eXtensible Mark-up Language (XML) parsing is provided using array pair data structures. An empty array pair is passed to an engine from client code via a CNI call. The engine parses the XML document and fills the array pair with fixed width elements. The filled array pair is passed back to client code. The client code iterates through the elements in the array pair and invokes the appropriate handlers or builds appropriate tree objects for Document Object Model parsing. Thus, one CNI call passes the empty array pair from client code to the engine, and the filled array pair is returned from the engine to client code. Individual sets of CNI calls for each element are avoided, minimizing the number of CNI calls. Further, since elements in the array pair are of fixed width, they can be processed more efficiently by the client code.

7 Claims, 2 Drawing Sheets

JNI-MINIMIZING DATA STRUCTURES FOR XML PARSING

CROSS REFERENCE TO RELATED APPLICATIONS

This application claims priority to U.S. provisional patent application, entitled "JNI-Minimizing Data Structures for XML Parsing", Ser. No. 60/801,324, filed on May 17, 2006.

BACKGROUND

1. Field

The present invention relates to XML parsing, and more particularly to minimizing JNI calls in XML parsing.

2. Related Art

Conventional eXtensible Mark-up Language (XML) parsers are typically written in Java. An example of an XML parser is a SAX push parser, which calls standard event handlers. Java suffers from poor performance. To improve performance, one could write the parser engine in C. In this example, the SAX parser reads a XML document and passes it to C code by making Java Native method Interface (JNI) calls. The C code parses the document and invokes the standard event handlers by function calls via the JNI mechanism, and creates Java object as required (such as strings) via the JNI mechanism. Here, for each event, a call is made from the C code to the Java code, and the Java code returns, via JNI. This is costly in performance.

Accordingly, there exists a need for JNI-minimizing XML parsing. The present invention addresses such a need.

SUMMARY

Client Native method Interface (CNI) minimizing XML parsing is provided using array pair data structures. An empty array pair is passed to an engine from client code via a CNI call. The engine parses the XML document and fills the array pair with fixed width elements. The filled array pair is passed back to client code. The client code iterates through the elements in the array pair and invokes the appropriate handlers or builds appropriate tree objects for DOM parsing. Thus, one CNI call is needed to obtain the filled array pair from the engine to client code. Individual CNI calls for each element (or handler invocation) are avoided, minimizing the number of CNI calls. Further, since elements in the array pair are of fixed width, they can be processed more efficiently by the client code.

DETAILED DESCRIPTION

Figure 1:
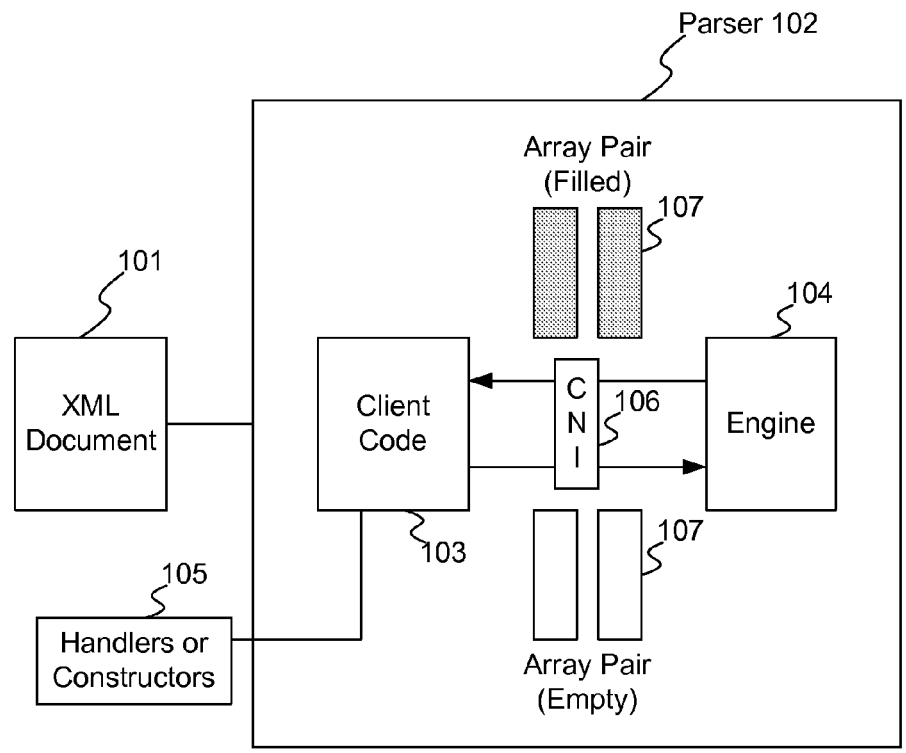
FIG. 1 illustrates an embodiment of the XML parser in accordance with the present invention.

FIG. 1 illustrates an embodiment of the XML parser in accordance with the present invention. The parser 102 includes client code 103 and an engine 104, which communicate via a Client Native method Interface (CNI) 106. Example client codes include .NET, Java, or other execution environment. Example engines include those implemented in C, assembly, or C++. Example CNI includes Java Native method Interface (JNI).

The parser 102 is able to invoke handlers or constructors 105 for the types of data in the XML document 101. Handlers and constructors 105 are known in the art and will not be further described here. The parser 102 minimizes CNI calls by using an array pair 107, as described further below.

Figure 2:
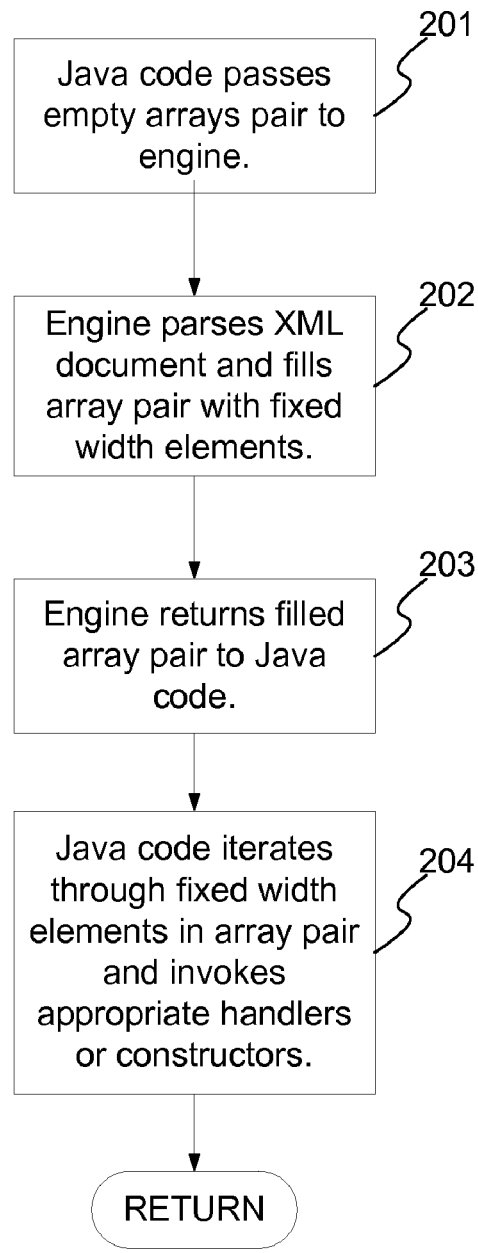
FIG. 2 is a flowchart illustrating an embodiment of a method for XML parsing using the array pair data structure in accordance with the present invention.

FIG. 2 is a flowchart illustrating an embodiment of a method for XML parsing using the array pair data structure in accordance with the present invention. Referring to both FIGS. 1 and 2, an XML document 101 is read by the parser 102. Assume that the client code 103 is Java code, and the CNI 106 is JNI. The Java code 103 reads the XML document and passes it, through the JNI 106, to the engine 104. The Java code also passes an empty array pair 107 to the engine 104 (step 201). The engine 104 parses the XML document 101 and fills the array pair 107 with fixed elements (step 202). The filled array pair 107 is then returned, through the JNI 106, back to the Java code 103 (step 203). The Java code 103 then iterates through the fixed width elements in the array pair 107 and invokes the appropriate handlers or constructors 105 (step 204).

One JNI call is made to pass the empty array pair 107 from Java code 103 to the engine 104, and the filled array pair 107 is returned from engine 104 to Java code 103. Individual sets of JNI calls for each element are avoided. The number of JNI calls is thus minimized. Further, since elements in the array pair 107 are of fixed width, they can be processed more efficiently by the Java code 103.

Figure 3:
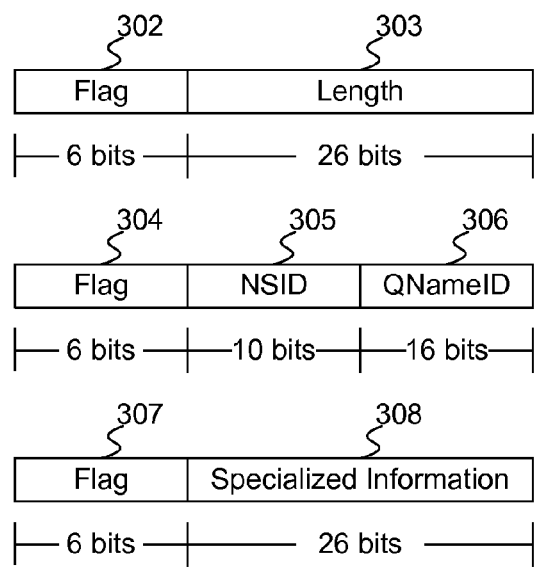
FIG. 3 illustrate XML token descriptors in the array pair data structure in accordance with the present invention.

According to the invention, one array of the array pair 107 stores 16-bit Java characters, while the other array stores 32-bit XML token descriptors that correspond to the 16-bit Java characters. The XML token descriptors can be one of two formats, as illustrated in FIG. 3. In a first format, each descriptor includes flag bits 302 followed by the length 303, used for XML tokens with strings. The tokens with strings can be character data, actual names for namespaces, attributes, etc. In a second format, each descriptor includes flag bits 304 followed by qualified name ID (QName ID) 306, or NSID 305 and qualified name ID (QNameID) 306, used for XML elements that represent metadata. Metadata can include start and end tags, attributes, etc. Optionally, the XML token descriptors can be a third format, which includes flag bits 307 followed by specialized information 308 for strings that look like numbers, or unique IDs for special string values. Example specialized information include floating point numbers.

The XML parser 102 according to the present invention is implemented as a pull parser. A SAX or DOM parser may be layered on top of this pull parser, by means of various implementations of the iteration through the array pair elements. Also, the results of the XML parser 102 may be filtered with ease using XPath. An XPath filter may be applied against the array pair elements to obtain string values corresponding to the XPaths, or to obtain a "pruned" version of the array pair with elements removed that do not pass the filter.

According to the invention, the array pair 107 provides a lossless representation of the XML document 101. The array pair 107 can thus be stored instead of the XML document 101. This avoids the overhead needed to recreate the array pair 107 if the XML document 101 is to be parsed again. The storage requirements for the array pair 107 may be less than that for the XML document 101.

Although the invention is described above with one array pair, one of ordinary skill in the art will understand that a plurality of array pairs may be used for the parsing of the XML document 101 without departing from the spirit and scope of the present invention. For example, as one array pair is filled by the engine 104 and returned, the Java code 103 passes another empty array pair to the engine 104. As the engine 104 fills this second array pair, the Java code 103 iterates through the filled array pair already received. Further, a single array, rather than an array pair, may be used, by interspersing special 16-bit tokens with 16-bit characters within the single array. Each XML token descriptor can include flag bits, or string length, or qualified name ID, or namespace ID, or specialized information.

The XML parser 102 according to the present invention can be implemented in either software or hardware. For example, the parser 102 can be implemented using Field Programmable Gate Arrays (FPGA).

Although the parser of the present invention is described above in the context of Java and C code, one of ordinary skill in the art will understand that the parser may be implemented in other programming languages without departing from the spirit and scope of the present invention.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

I claim:

1. A method for Client Native method Interface (CNI) minimizing eXtensible Mark up Language (XML) parsing of an XML document by a client code and an engine executed by a computing device, wherein the CNI comprises a Java Native method Interface, wherein the client code comprises Java code, comprising:

(a) passing, by the computing device, the XML document and an empty array pair from the client code to the engine by making a CNI call;
   (b) parsing the XML document, and filling the empty array pair with fixed width elements resulting from the parsing, by the engine of the computing device; and
   (c) returning, by the computing device, the filled array pair from the engine to the client code, wherein the filled array pair comprises:
   a first array of elements comprising 16-bit Java characters; and
   a second array of elements comprising 32-bit XML token descriptors corresponding to the 16-bit Java characters in the first array.

2. The method of claim 1, wherein each XML token descriptor comprises:
   flag bits and a length for the element; or
   flag bits and a qualified name ID.

3. The method of claim 2, wherein at least one XML token descriptor further comprises flag bits and specialized information.

4. The method of claim 1, wherein each XML token descriptor comprises:
   flag bits and length for the element; or
   flag bits, namespace ID and qualified name ID.

5. The method of claim 4, wherein at least one XML token descriptor further comprises flag bits and specialized information.

6. The method of claim 1, further comprising:
   (d) applying at least one filter to the filled array pair.

7. The method of claim 1, further comprising:
   (d) iterating through the fixed width elements in the filled array pair by the client code; and
   (e) invoking appropriate handlers or constructors for each fixed width element by the client code.

* * * * *